(12) United States Patent
Liu et al.

(10) Patent No.: US 9,666,853 B2
(45) Date of Patent: May 30, 2017

(54) BUS BAR MODULE

(71) Applicant: YAZAKI CORPORATION, Tokyo (JP)

(72) Inventors: Haifeng Liu, Kakegawa (JP); Yukihisa Kikuchi, Kakegawa (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 283 days.

(21) Appl. No.: 14/597,394

(22) Filed: Jan. 15, 2015

(65) Prior Publication Data

US 2015/0140392 A1 May 21, 2015

Related U.S. Application Data

(63) Continuation of application No. PCT/JP2013/069345, filed on Jul. 17, 2013.

(30) Foreign Application Priority Data

Jul. 20, 2012 (JP) ................ 2012-161421

(51) Int. Cl.
*H01M 2/26* (2006.01)
*H01M 2/28* (2006.01)
*H01M 2/20* (2006.01)
*H01M 2/30* (2006.01)

(52) U.S. Cl.
CPC ........... *H01M 2/204* (2013.01); *H01M 2/202* (2013.01); *H01M 2/206* (2013.01); *H01M 2/30* (2013.01)

(58) Field of Classification Search
CPC ...... H01M 2/202; H01M 2/204; H01M 2/206; H01M 2/30
See application file for complete search history.

(56) References Cited

U.S. PATENT DOCUMENTS 6,261,719 B1 7/2001 Ikeda et al.

FOREIGN PATENT DOCUMENTS

| EP | 2871693 A1 | 5/2015 |
|---|---|---|
| JP | 2000-149909 A | 5/2000 |
| JP | 2006-269103 A | 10/2006 |

(Continued)

OTHER PUBLICATIONS

Communication dated Jun. 21, 2016, from the Japanese Patent Office in counterpart application No. 2012-161421.

(Continued)

*Primary Examiner* — Eli Mekhlin
(74) *Attorney, Agent, or Firm* — Sughrue Mion, PLLC

(57) ABSTRACT

A bus bar module includes an output terminal that has a male screw, a tab for preventing a wiring terminal from being rotated subserviently, and a terminal connecting portion with which a terminal of a battery element in a battery pack is connected, and a module main body from which a portion of a terminal installation portion to which the output terminal is installed is protruded. The terminal installation portion has an engagement tab that elastically deforms during an installation of the output terminal and recovers after the installation to engage the output terminal with the terminal installation portion. The tab is located so as to prevent a tool from contacting with the engagement tab when connecting the terminal connecting portion with the terminal of the battery element. According to the module, the output terminal can be prevented from dropping off even during its installation to the battery pack.

4 Claims, 7 Drawing Sheets

(56) References Cited

FOREIGN PATENT DOCUMENTS

| | | | |
|---|---|---|---|
| JP | 2006-269104 | A | 10/2006 |
| JP | 2012-109196 | A | 6/2012 |
| JP | 2012153327 | A | 8/2012 |
| JP | 2013-16381 | A | 1/2013 |
| JP | 2014-3739 | A | 1/2014 |
| WO | 2013187056 | A1 | 12/2013 |

OTHER PUBLICATIONS

International Search Report for PCT/JP2013/069345 dated Oct. 1, 2013.

Communication dated Apr. 8, 2016, issued by the European Patent Office in corresponding application No. 13819590.4.

BUS BAR MODULE

CROSS-REFERENCE TO RELATED APPLICATIONS

The present application is a Continuation Application of PCT International Application No. PCT/JP2013/069345 (filed on Jul. 17, 2013), which is based upon and claims the benefit of priority from Japanese Patent Application No. 2012-161421 (filed on Jul. 20, 2012), the entire contents of which are incorporated herein with reference.

BACKGROUND OF THE INVENTION

Technical Field

The present invention relates to a bus bar module, especially to a bus bar module that includes an output terminal and is installed to a battery pack made up of plural battery elements (battery cells or battery modules).

Background Art

Japanese Unexamined Patent Publication No. 2006-269104 discloses a bus bar module 301 shown in FIG. 6 and FIG. 7. The bus bar module 301 includes a resin case 302. An output terminal (a bus bar) 303 is attached to the resin case 302. A screw 305 is swaged to one side of the output terminal 303. Then, a wire from another device is connected to the screw 305.

A battery binding post 307 is provided on another side of the output terminal 303. The output terminal 303 is electrically connected with a terminal of a battery pack via the battery binding post 307. The output terminal 303 is engaged with the resin case 302 by a locking projection 309.

SUMMARY OF INVENTION

However, in the above-explained bus bar module 301, the locking projection 309 for engaging the output terminal 303 is exposed. Therefore, when installing the bus bar module 301 to the battery pack (at an assembly line of for assembling the bus bar module 301 to the battery pack), it is concerned that an operator may hit his/her tool carelessly on the locking projection 309 before the bus bar module 301 is connected with the battery pack by the battery binding post 307. If the tool is hit on the locking projection 309, it is concerned that the output terminal 303 engaged by the locking projection 309 may drop off from the resin case 302 due to an external force thereof.

An object of the present invention is to provide a bus bar module that can prevent its output terminal from dropping off even during its installation to a battery pack.

An aspect of the present invention provides a bus bar module to be installed to a battery pack for serially connecting plural battery elements in the battery pack, the module comprising: an output terminal that has a male screw, a tab for preventing, when connecting a wiring terminal with the male screw, the wiring terminal from being rotated subserviently, and a terminal connecting portion with which a terminal of one of the plural battery elements is connected; and a module main body that is formed of an insulative material and from which a portion of a terminal installation portion to which the output terminal is installed is protruded, wherein the terminal installation portion has an engagement tab that elastically deforms during an installation of the output terminal and recovers after the installation to engage the output terminal with the terminal installation portion, and the tab is located at a position that prevents a tool from contacting with the engagement tab when connecting the terminal connecting portion with the terminal of the one of the plural battery elements.

Here, it is preferable that the module main body includes a base plate, and a protruded plate protruded from the base plate, the terminal installation portion is configured of the protruded plate and a portion of the base plate, the output terminal has a plate-shaped first portion and a plate-shaped second portion perpendicular to the first portion in addition to the tab and the terminal connecting portion, the terminal connecting portion is provided on the first portion, and the male screw and the tab whose height is lower than a height of the mail screw are provided on the second portion, and, after the installation of the output terminal to the terminal installation portion, the second portion is mated with the protruded plate and protruded from the base plate together with the protruded plate and the first portion is mated with the portion of the base plate to locate the tab near the terminal connecting portion.

Further, it is preferable that the base plate is configured to prevent a tool from contacting with the engagement tab when connecting the wiring terminal with the male screw.

DESCRIPTION OF EMBODIMENTS

Figure 1:
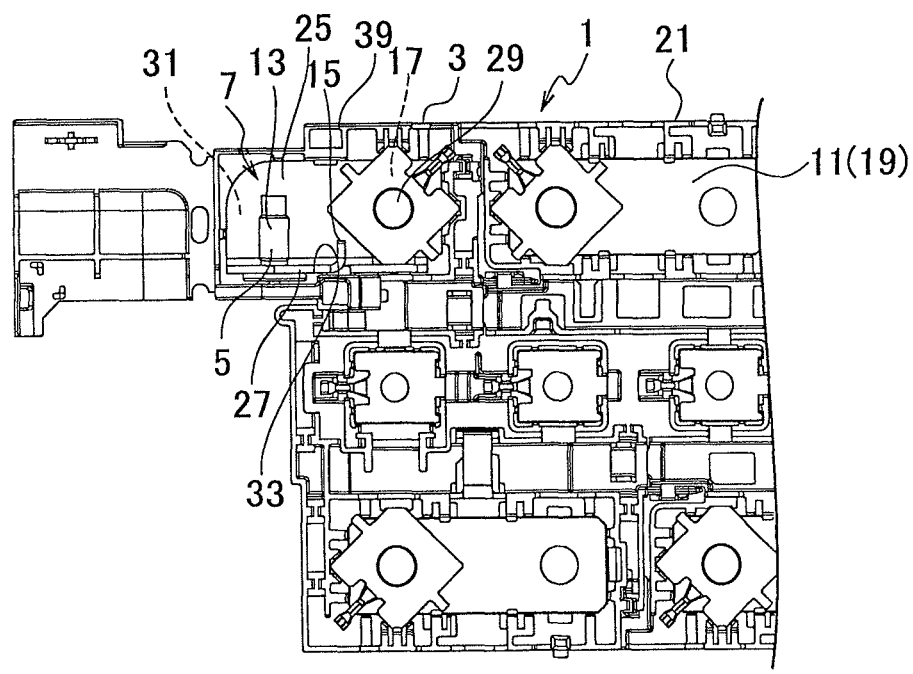
FIG. 1 is a partial front view of one end of a bus bar module according to an embodiment.
Figure 2:
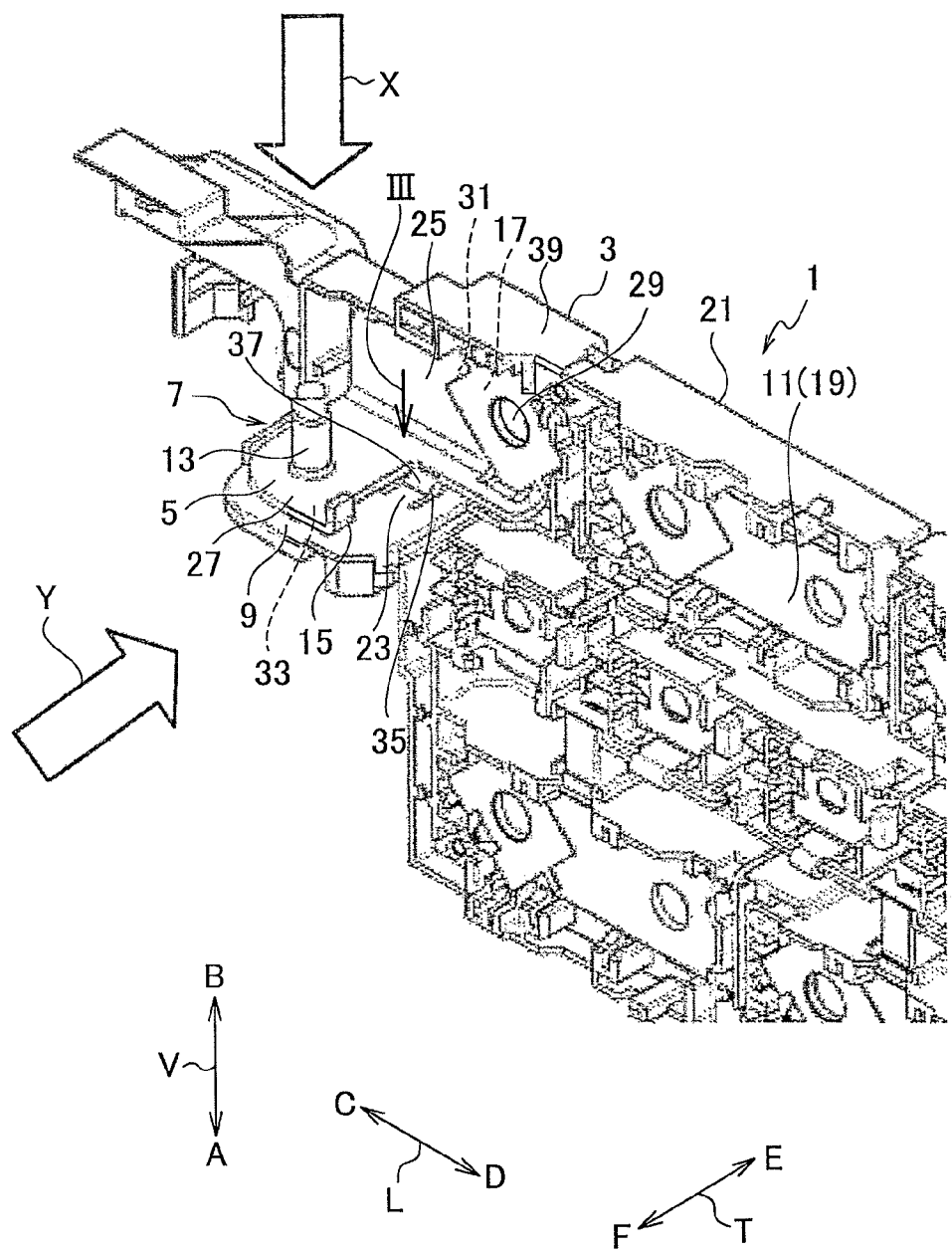
FIG. 2 is a partial perspective view of the one end.

An embodiment of a bus bar module (battery connecting member) will be explained with reference to the drawings. The bus bar module 1 in the present embodiment is installed, for example, to a side face of a battery pack (not shown) in order to serially connect plural battery elements (battery modules or battery cells) in the battery pack. Note that the battery element(s) in the present embodiment is battery module(s).

Herein after, for the sake convenience of explanations, a direction in the bus bar module 1 is denoted as a longitudinal (X-axis) direction L, a direction perpendicular to the longitudinal direction L is denoted as a vertical (Y-axis) direction V, and a direction perpendicular to both of the longitudinal direction L and the vertical direction V is denoted as a thickness (Z-axis) direction T, as shown in the drawings. In addition, defined are one side A and another side B with respected to the vertical direction V, one side C and another side D with respect to the longitudinal direction L, and one side E and another side F with respect to the thickness direction T.

The battery module(s) is formed to be a long cuboid, and a plus terminal and a minus terminal are protruded from its one face. The battery pack is configured of the plural battery modules having the same shape. In the battery pack, the plural battery modules are aligned to be oriented in the same direction, and a longitudinal direction of the battery module(s) is coincident with the thickness direction T (horizontal direction) of the bus bar module 1. Faces of the battery modules, from each of which the plus terminal and the minus terminal are protruded, configure one side face of the battery pack. Opposite faces of the battery modules, to the faces from each of which the plus terminal and the minus terminal are protruded, configure another side face (an opposite side face to the one side face) of the battery pack. Namely, in the battery pack, in the longitudinal direction L (horizontal direction) perpendicular to the thickness direction T, the plural battery modules are contacted with each other or distanced from each other to form a gap therebetween.

In addition, in the battery pack, in the vertical direction, sets of the battery modules aligned in the longitudinal direction L are further contacted with each other or distanced from each other to form a gap therebetween, and thereby stacked in multiple layers. Therefore, when viewing the battery pack from the thickness direction T (a side from which the plus terminals and the minus terminals are protruded), the plural battery modules are arranged in horizontal and vertical directions. Further, on the face from which the plus terminals and the minus terminals are protruded, the plus terminals and the minus terminals are aligned alternately in the longitudinal direction L.

As shown in FIG. 1 to FIG. 5, the bus bar module 1 includes a module main body 3 and an output terminal 5. The module main body 3 is formed of an insulative material (for example, injection-molded with insulative synthetic resin). In addition, a portion (protruded plate 9) of a terminal installation portion (terminal support portion) 7 to which the output terminal 5 is installed is formed on the module main body 3. Plural metal flat plate bus bars 11 are inset-onto and thereby held-on the module main body 3. In addition, the output terminal 5 is inset-onto and thereby held-on the module main body 3 (the terminal installation portion 7). The bus bar module 1 is configured of the module main body 3, the bus bars 11 and the output terminal 5 attached to the module main body 3, and so on.

The bus bars 11 attached to the module main body 3 are connected with terminals of the battery modules, respectively, when the bus bar module 1 is installed to the battery pack, so that the battery modules of the battery pack are connected serially. The output terminal 5 includes a male screw (binding post) 13, a tab 15 for preventing a ring terminal of wiring from rotating when fixing the ring terminal with the male screw 13, and a terminal connecting portion 17 to be connected with a terminal of the battery module.

The output terminal 5 is made of conductive metal. When the bus bar module 1 is installed to the battery pack, the terminal connecting portion 17 of the output terminal 5 is electrically connected with the battery pack by inserting a terminal of the outermost battery module into a through hole 29 of the terminal connecting portion 17 and then fastening a nut on the terminal.

The module main body 3 includes a rectangular planer portion (base plate) 21 on which plural bus-bar installation portions 19 are provided, and the protruded plate 9 formed at an end (on the one side C of the longitudinal direction L and on the other side B of the vertical direction V) of the base plate 21. The protruded plate 9 is protruded from the base plate 21 to the other side F of the thickness direction T. The terminal installation portion 7 is configured of the protruded plate 9 and a portion of the base plate 21 near the protruded plate 9.

The base plate 21 is attached to a side face of the battery pack from which the plus terminals and the minus terminals are protruded. At this time, the thickness direction T of the base plate 21 is perpendicular to the side face of the battery pack. In addition, the protruded plate 9 is protruded in a direction perpendicular to the side face of the battery pack so as to get away from the battery pack (namely, protruded to the other side F of the thickness direction T, as explained above). In addition, a thickness direction of the protruded plate 9 coincides with the vertical direction V of the bus bar module 1.

An engagement tab 23 is provided on the terminal installation portion 7 (the protruded plate 9). The engagement tab 23 elastically deforms during an installation of the output terminal 5 to the terminal installation portion 7 and then recovers after the installation, so that it engages the installed output terminal 5 with the terminal installation portion 7 to hold the output terminal 5. In addition, unlatching of the engagement tab 23, by a tool such as a box wrench for fastening a nut when electrically connecting the terminal connecting portion 17 with the terminal of the battery module as explained above, is prevented by the above-explained tab 15 (see an insertion direction Y of the tool shown in FIG. 2).

The output terminal 5 includes a plate-shaped first portion 25, a plate-shaped second portion 27 perpendicular to the first portion 25, and the male screw 13. The first portion 25 and the second portion 27 are formed by bending a metal plate. The through hole 29 is formed on the first portion 25, so that the above-explained terminal connecting portion 17 is configured. The male screw 13 and the tab 15 whose height is lower than that of the male screw 13 are provided at the second portion 27 as explained above. The male screw 13 and the tab 15 are protruded to the other side B of the vertical direction V. The tab 15 is formed by bending a portion of the second portion 27.

After the installation of output terminal 5 to the terminal installation portion 7, the second portion 27 is mated with the protruded plate 9 and is protruded from the base plate 21 together with the protruded plate 9, and the first portion 25 is mated with the portion (extended portion) of the base plate 21 near the protruded plate 9. In addition, when viewing an installation state of the output terminal 5 to the terminal installation portion 7 from the other side F of the thickness direction T, the tab 15 is located near the through hole 29 (see FIG. 3C). In addition, unlatching of the engagement tab 23, by a tool such as a box wrench for fastening a nut when fixing a ring terminal of wiring with the male screw 13, is prevented by a side wall 39 extended from a circumference of the base plate 21 (see an insertion direction X of the tool shown in FIG. 2).

The bus bar module 1 will be explained more in detail. Although the output terminal 5 is configured of the first portion 25 and the second portion 27 as explained above, a width of the first portion 25 along the longitudinal direction L is wider than a width of the second portion 27 along the longitudinal direction L. In addition, the output terminal 5 is formed by cutting out a rectangular piece from one corner of a rectangular metal plate and then bending the metal plate along a bend line slightly distanced from this cut-out portion by 90 degrees. The second portion 27 is formed on a side of the cut-out portion, and the first portion 25 is formed on a side other than the side of the cut-out portion.

The terminal installation portion 7 has two flat surfaces 31 and 33. The flat surface 31 is a surface, on the other side F of the thickness direction T, of the above-mentioned extended portion of the base plate 21. The flat surface 33 is a surface, on the other side B of the vertical direction V, of the protruded plate 9. The flat surfaces 31 and 33 continue perpendicularly.

The engagement tab 23 is formed in a cantilever manner by a U-shaped slit 35 formed on the protruded plate 9. A base end of the engagement tab 23 is located on a side of a tip end of the protruded plate 9 (the other side F of the thickness direction T), and a tip end of the engagement tab 23 is located on a side of a base end of the protruded plate 9 (the one side E of the thickness direction T). In addition, the engagement tab 23 (the slit 35) is located on a side of the other end D of the protruded plate 9 along the longitudinal direction L, and is located on the center of the protruded plate 9 along the thickness direction T. Further, an engagement pawl 37 is formed at the tip end of the engagement tab 23, and the engagement pawl 37 is protruded upward from the flat surface 33 (toward the other side B of the vertical direction V).

The engagement tab 23 is bent downward (toward the one side C of the vertical direction A) when being pushed by the output terminal 5 (the second portion 27) during the installation of the output terminal 5 to the terminal installation portion 7. After the installation of the output terminal 5 to the terminal installation portion 7, the first portion 25 of the output terminal 5 contacts planarly with the flat surface 31 of the base plate 21 and the second portion contacts planarly with the flat surface 33 of the protruded plate 9, and the engagement tab 23 recovers to contact the engagement pawl 37 with an edge (of the cut-out portion) of the output terminal 5. As a result, the output terminal 5 is held by the flat surface 31 and the engagement tab 23, and thereby fixed on the terminal installation portion 7 (the module main body 3).

When viewing the installation state of the output terminal 5 to the terminal installation portion 7 from the vertical direction V, the male screw 13 is located at the center of the second portion 27, and the tab 15 is located on the other side D of the second portion 27 along the longitudinal direction L and is located on the other side F of the second portion 27 along the thickness direction T (on the side of the tip end of the protruded plate 9). In addition, as explained above, contacts of a tool such as a box wrench for fastening a nut with the engagement tab 23, when fixing a ring terminal of wiring with the male screw 13, is prevented by the side wall 39 of the base plate 21. Further, the through hole 29 is located near the engagement tab 23 and the tab 15.

Figure 4:
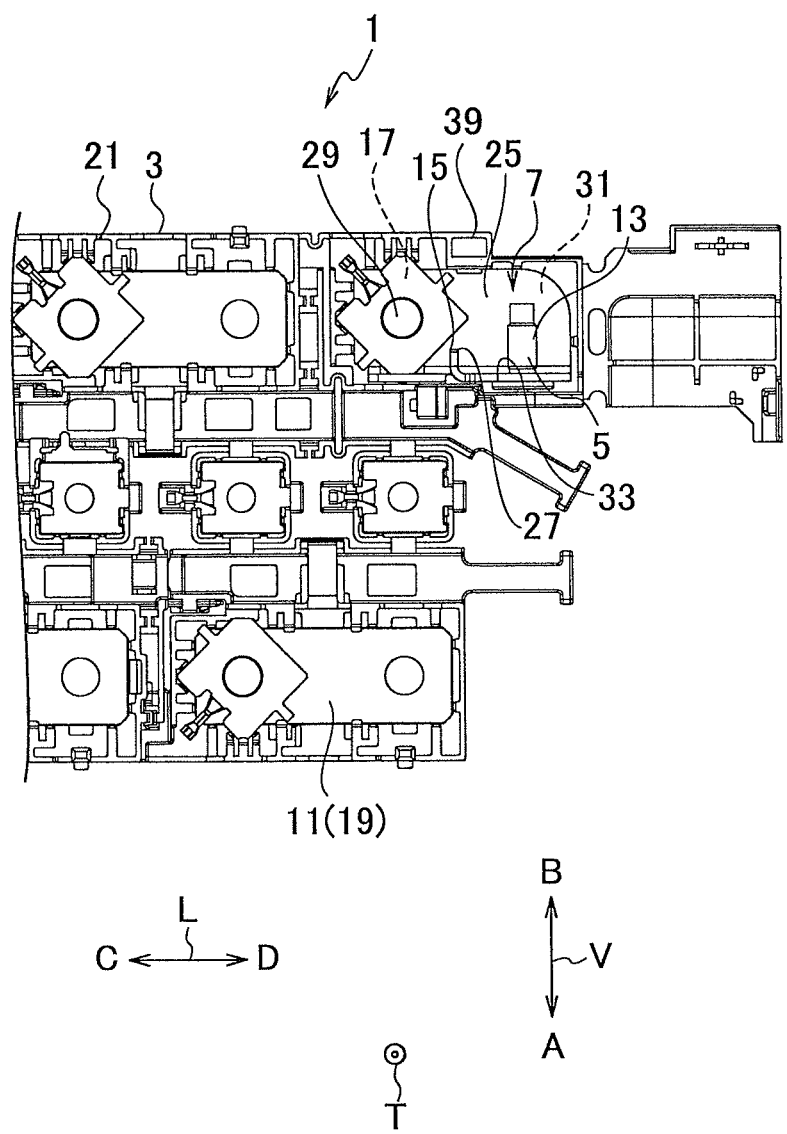
FIG. 4 is a partial front vie of another end of the bus bar module.
Figure 5:
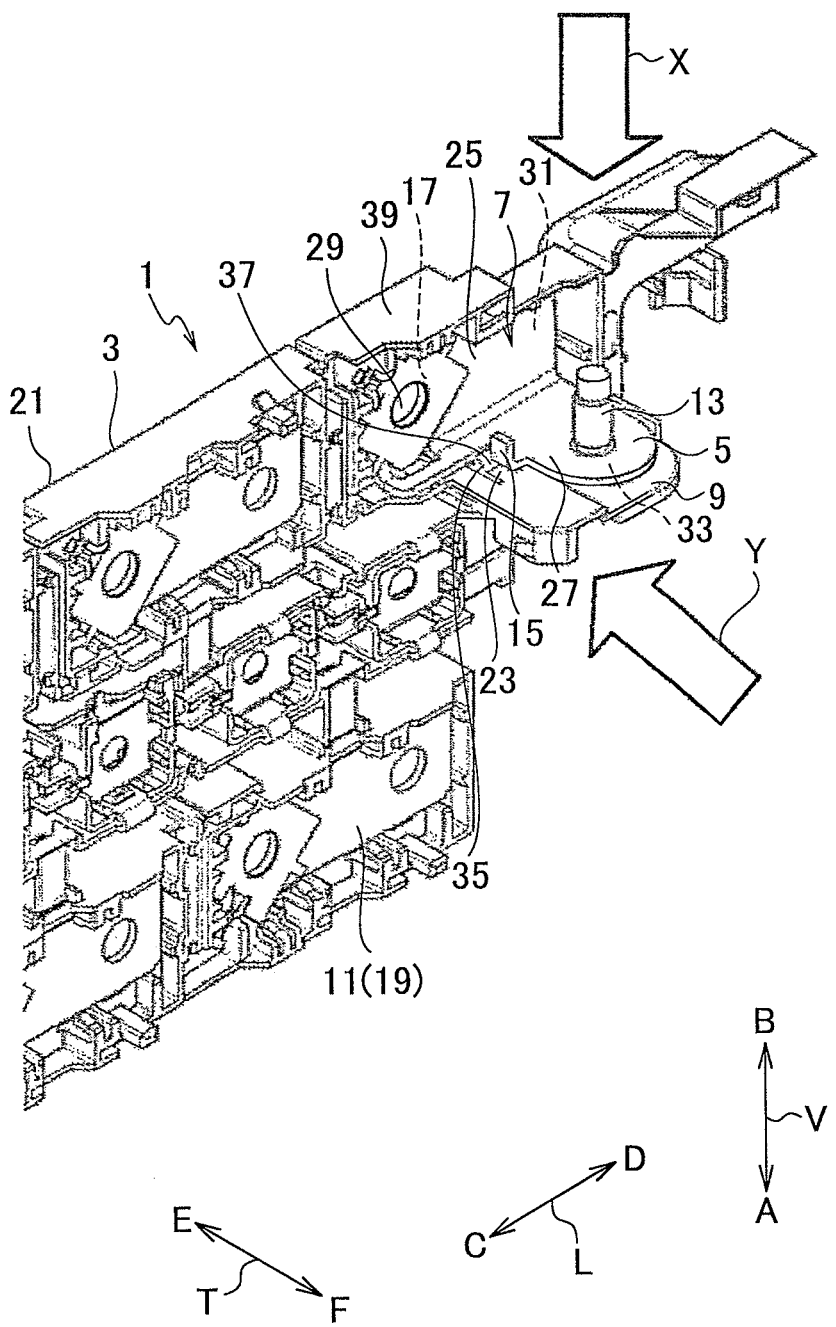
FIG. 5 is a perspective view of the other end.
Figure 6:
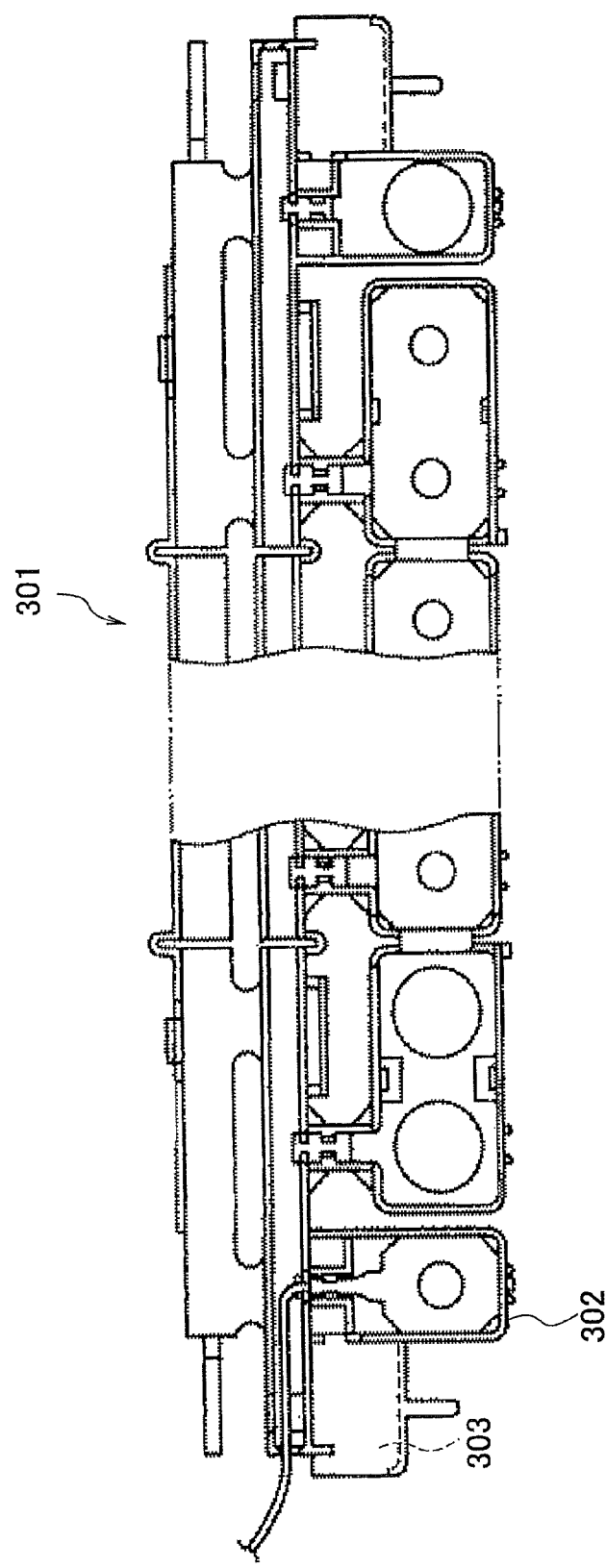
FIG. 6 is a front view of a prior-art bus bar module.
Figure 7:
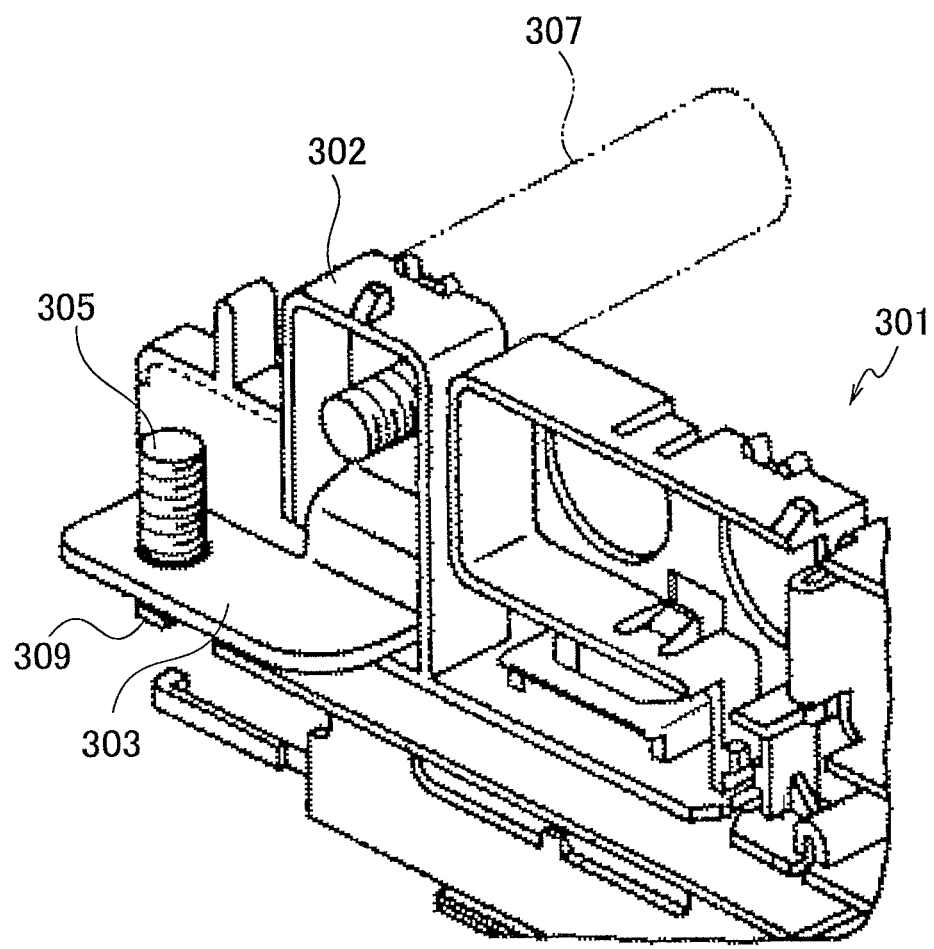
FIG. 7 is a partial perspective view of the bus bar module.

Although configurations (the output terminal 5 and so on) of the bus bar module 1 on the one side C of the longitudinal direction L are explained as above, configurations (the output terminal 5 and so on) on the other side D of the longitudinal direction L are also provided symmetrically in the bus bar module 1 of the present embodiment, as shown in FIG. 4 and FIG. 5.

Next, an installation of the bus bar module 1 to the battery pack will be explained. First, the output terminal 5 is installed to the terminal installation portion 7 of the module main body 3 to which the bus bars 11 and so on are already attached. Subsequently, a terminal of a battery module is inserted into the through hole 29 of the terminal connecting portion 17, and the terminal of the battery module and the output terminal 5 are electrically connected with each other by fastening a nut on the terminal. The electrical connection between the terminal of the battery module and the output terminal 5 is made on the one side C and the other side D of the bus bar module 1 along the longitudinal direction L, so that the output terminal 5 on the one side C is a plus electrode and thereby the output terminal 5 on the other side D is a minus electrode. In these manners, the bus bar module 1 is installed to the battery pack. The tool insertion direction Y at this installation is a direction from the other side F to the one side E along the thickness direction T. Then, a ring terminal of a wire from another device is connected with the male screw 13 of the output terminal 5. The tool insertion direction X for this installation is a direction from the other side B to the one side A along the vertical direction V.

Figure 3A:
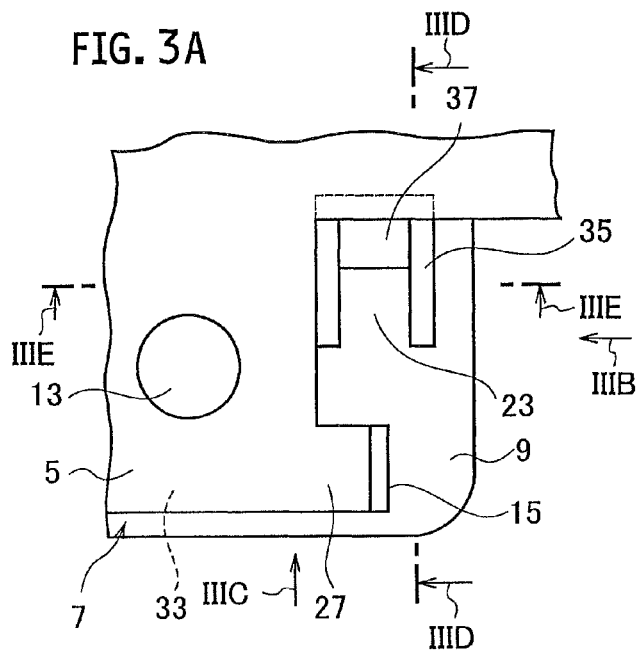
FIG. 3A is an enlarged plan view of a featured portion of the one end when viewed from a direction indicated by an arrow III shown in FIG. 2.
Figure 3B:
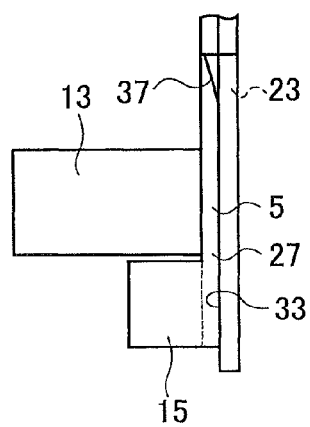
FIG. 3B is a side view of the featured portion when viewed from a direction indicated by an arrow IIIB shown in FIG. 3A.
Figure 3C:
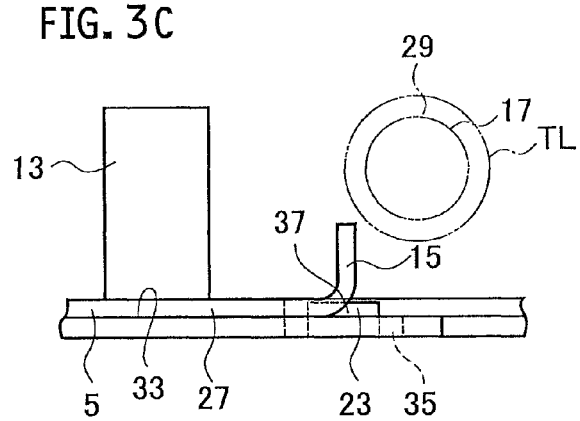
FIG. 3C is a side view of the featured portion when viewed from a direction indicated by an arrow IIIC shown in FIG. 3A.
Figure 3D:
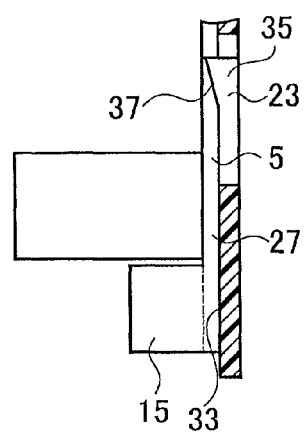
FIG. 3D is a side view of the featured portion when viewed from a direction indicated by an arrow IIID shown in FIG. 3A.
Figure 3E:
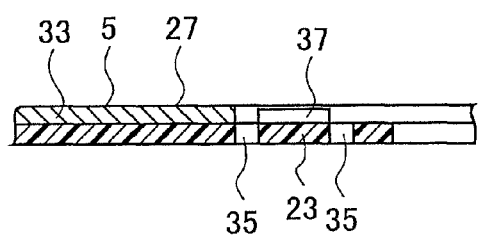
FIG. 3E is a cross-sectional view of the featured portion taken along a line IIIE-IIIE shown in FIG. 3A.

According to the bus bar module 1 in the present embodiment, when electrically connecting the terminal connecting portion 17 of the output terminal 5 with the terminal of the battery module (or the battery cell) of the battery pack, the tab 15 prevents the tool from contacting with the engagement tab 23 (see FIG. 3C). Therefore, the output terminal 5 can be prevented from dropping off from the module main body 3 during the installation of the bus bar module to the battery pack.

In addition, when connecting a terminal of wiring with the male screw 13, (the side wall 39 of) the base plate 21 prevents the tool from contacting with the engagement tab 23. Therefore, in addition to the installation of the bus bar module 1 to the battery pack, the output terminal 5 can be prevented from dropping off while connecting the terminal of wiring with the male screw 13, and the engagement tab 23 can be prevented from being damaged, too.

What is claimed is:

1. A bus bar module to be installed to a battery pack for serially connecting plural battery elements in the battery pack, the module comprising:
   an output terminal including:
      a conductive plate:
      a male screw protruding from the conductive plate in a first direction;
      a tab spaced apart from the male screw and protruding from the conductive plate in the first direction: and;
      a terminal connecting portion provided on the conductive plate, for connecting to a terminal of one of the plural battery elements; and
   a module main body that is formed of an insulative material and including a terminal installation portion, the output terminal being installed to the terminal installation portion, the terminal installation portion being protruded from the module main body, wherein:
   the terminal installation portion includes an engagement tab configured to elastically deform in response to the output terminal being installed to the terminal installation portion and configured to recover after the output terminal being installed to the terminal installation portion,
   the tab of the output terminal is located at a position offset in a second direction and a third direction from the male screw, the first, second and third directions being perpendicular from one another, and
   wherein:
   the module main body includes:
      a base plate; and
      a protruded plate protruded from the base plate,
   the terminal installation portion includes the protruded plate and a portion of the base plate, the conductive plate includes:
- a plate-shaped first portion; and
- a plate-shaped second portion perpendicular to the first portion, the terminal connecting portion is provided on the first portion, and the male screw and the tab of the output terminal whose height is lower than a height of the male screw are provided on the second portion, and, after the output terminal being installed to the terminal installation portion, the first portion is mated with the portion of the base plate and the second portion is mated with the protruded plate and the second portion being protruded from the base plate together with the protruded plate to locate the tab of the output terminal near the terminal connecting portion.

2. The bus bar module according to claim 1, wherein the base plate protrudes in a direction parallel with a protruding direction of the terminal installation portion protruding from the module main body.

3. The bus bar module according to claim 1, wherein the tab corresponds to a bent portion of the conductive plate.

4. The bus bar module according to claim 1, wherein the tab of the output terminal is configured to prevent a wiring terminal configured to be connected to the male screw from being rotated, when connecting the wiring terminal with the male screw.

* * * * *